United States Patent
Arimilli et al.

(10) Patent No.: US 6,292,872 B1
(45) Date of Patent: Sep. 18, 2001

(54) CACHE COHERENCY PROTOCOL HAVING HOVERING (H) AND RECENT (R) STATES

(75) Inventors: Ravi Kumar Arimilli, Austin; John Steven Dodson, Pflugerville; Jerry Don Lewis, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/024,609

(22) Filed: Feb. 17, 1998

(51) Int. Cl.⁷ .................................................. G06F 12/00

(52) U.S. Cl. .................... 711/146; 711/141; 711/144; 711/145

(58) Field of Search ................... 711/744, 146, 711/122, 133, 145, 141

(56) References Cited

U.S. PATENT DOCUMENTS

| | | | |
|---|---|---|---|
| 5,119,485 | * 6/1992 | Ledbetter, Jr. et al. | 711/146 |
| 5,265,235 | 11/1993 | Sindhu et al. | |
| 5,274,787 | 12/1993 | Hirano et al. | 711/143 |

(List continued on next page.)

FOREIGN PATENT DOCUMENTS

| | | |
|---|---|---|
| 0378399A2 | 7/1990 | (EP) . |
| 0438211A2 | 7/1991 | (EP) . |
| 0489556A2 | 6/1992 | (EP) . |
| 0681241A1 | 11/1995 | (EP) . |
| 2178205A | 2/1987 | (GB) . |
| 3253963A | 11/1991 | (JP) . |
| 06110785A | 4/1994 | (JP) . |
| 06110844A | 4/1994 | (JP) . |

OTHER PUBLICATIONS

Eggers et al., "Evaluating the Performance of Four Snooping Cache Coherency Protocols," Computer Architecture Conference Proceedings, Washington, No. 3, Jun. 17, 1989, pp. 2–15.

Hamaguchi et al., "Proposal of a Revalidating–Type Multi––Cache Consistency Protocol and its Evaluation", Information Systems Research Center, Canon, Inc., pp. 115–120, 7/18/90.

(Jim Handy, The Cache Memory Book, p. 165–169, (c) 1993).*

(Jim Handy, The Cache Memory Book, p. 42, (c) 1993).*

Jim Handy, The Cache Memory book, 1998, pp. 150–151.*

Susan Eggers et al., "Evaluating the Performance of Four Snooping Cache Coherency Protocols", Computer Architecture Conference Proceedings, Washington, pp. 2–15, Jun. 17, 1989.

*Primary Examiner*—Matthew Kim
*Assistant Examiner*—Brian R. Peugh
(74) *Attorney, Agent, or Firm*—Volel Emile Bracewell & Patterson, L.L.P.

(57) ABSTRACT

A cache and method of maintaining cache coherency in a data processing system are described. The data processing system includes a plurality of processors and a plurality of caches coupled to an interconnect. According to the method, a first data item is stored in a first of the caches in association with an address tag indicating an address of the first data item. A coherency indicator in the first cache is set to a first state that indicates that the tag is valid and that the first data item is invalid. Thereafter, the interconnect is snooped to detect a data transfer initiated by another of the plurality of caches, where the data transfer is associated with the address indicated by the address tag and contains a valid second data item. In response to detection of such a data transfer while the coherency indicator is set to the first state, the first data item is replaced by storing the second data item in the first cache in association with the address tag. In addition, the coherency indicator is updated to a second state indicating that the second data item is valid and that the first cache can supply said second data item in response to a request.

16 Claims, 3 Drawing Sheets

U.S. PATENT DOCUMENTS

| | | | |
|---|---|---|---|
| 5,282,272 | 1/1994 | Guy et al. | 710/116 |
| 5,287,484 | 2/1994 | Nishii et al. | 711/144 |
| 5,319,766 * | 6/1994 | Thaller et al. | 395/425 |
| 5,522,057 | 5/1996 | Lichy | 711/144 |
| 5,551,001 | 8/1996 | Cohen et al. | 711/122 |
| 5,588,131 | 12/1996 | Borrill | 711/146 |
| 5,598,550 | 1/1997 | Shen et al. | 711/146 |
| 5,666,509 | 9/1997 | McCarthy et al. | 711/200 |
| 5,671,391 | 9/1997 | Knotts . | |
| 5,737,757 | 4/1998 | Hassoun et al. | 711/145 |
| 5,900,016 | 5/1999 | Ghosh | 711/143 |
| 6,014,728 | 1/2000 | Baror | 711/133 |
| 6,038,644 | 3/2000 | Irie et al. | 711/141 |
| 6,049,849 | 4/2000 | Armilli et al. | 711/133 |

* cited by examiner

CACHE COHERENCY PROTOCOL HAVING HOVERING (H) AND RECENT (R) STATES

BACKGROUND OF THE INVENTION

1. Technical Field

The present invention relates in general to a method and system for data processing and in particular to a method and system for maintaining cache coherency in a multiprocessor data processing system. Still more particularly, the present invention relates to a cache coherency protocol for a multiprocessor data processing system, which includes a recent (R) state that supports shared intervention and a hovering (H) state that permits a first cache to be updated with valid data in response to a second cache independently transmitting the valid data on an interconnect coupling the first and second caches.

2. Description of the Related Art

In a conventional symmetric multiprocessor (SMP) data processing system, all of the processors are generally identical, that is, the processors all utilize common instruction sets and communication protocols, have similar hardware architectures, and are generally provided with similar memory hierarchies. For example, a conventional SMP data processing system may comprise a system memory, a plurality of processing elements that each include a processor and one or more levels of cache memory, and a system bus coupling the processing elements to each other and to the system memory. To obtain valid execution results in an SMP data processing system, it is important to maintain a coherent memory hierarchy, that is, to provide a single view of the contents of memory to all of the processors.

A coherent memory hierarchy is maintained through the use of a selected memory coherency protocol, such as the MESI protocol. In the MESI protocol, an indication of a coherency state is stored in association with each coherency granule (e.g., cache line or sector) of at least all upper level (cache) memories. Each coherency granule can have one of four states, modified (M), exclusive (E), shared (S), or invalid (I), which is indicated by two bits in the cache directory. The modified state indicates that a coherency granule is valid only in the cache storing the modified coherency granule and that the value of the modified coherency granule has not been written to system memory. When a coherency granule is indicated as exclusive, the coherency granule is resident in, of all caches at that level of the memory hierarchy, only the cache having the coherency granule in the exclusive state. The data in the exclusive state is consistent with system memory, however. If a coherency granule is marked as shared in a cache directory, the coherency granule is resident in the associated cache and in at least one other cache at the same level of the memory hierarchy, all of the copies of the coherency granule being consistent with system memory. Finally, the invalid state indicates that the data and address tag associated with a coherency granule are both invalid.

The state to which each coherency granule (e.g., cache line) is set is dependent upon both a previous state of the cache line and the type of memory access sought by a requesting processor. Accordingly, maintaining memory coherency in the multiprocessor data processing system requires that the processors communicate messages across the system bus indicating their intention to read or write memory locations. For example, when a processor desires to write data to a memory location, the processor must first inform all other processing elements of its intention to write data to the memory location and receive permission from all other processing elements to carry out the write operation. The permission messages received by the requesting processor indicate that all other cached copies of the contents of the memory location have been invalidated, thereby guaranteeing that the other processors will not access stale local data. This exchange of messages is known as cross-invalidation (XI).

The present invention includes a recognition that while cross-invalidation of cache entries serves to maintain memory coherency in a SMP data processing system, the invalidation of cache entries by remote processors adversely affects data processing system performance by decreasing hit ratios in local caches. Thus, even if equipped with large local caches, a processing element can incur long access latencies when retrieving data that were once resident in a local cache from either a remote cache in another processing element or from system memory. As should thus be apparent, it would be desirable to provide a method and system for maintaining memory coherency in a SMP data processing system that reduces the performance penalty incurred as a result of the cross-invalidation of cache entries.

The present invention also includes a recognition that the conventional MESI protocol does not support efficient retrieval of data stored in remote caches. Although some known multiprocessor data processing systems support so-called modified intervention, which permits a remote cache storing data in the modified state to supply the modified data in response to a read request, the MESI protocol does not allocate responsibility for sourcing data to another processing element when the requested data is in the shared state. Thus, although requested data may be stored in multiple remote caches at a relatively low access latency, in conventional multiprocessor data processing systems shared data must always be retrieved from system memory. It would therefore be desirable to provide an improved cache coherency protocol that supports shared intervention.

SUMMARY OF THE INVENTION

It is therefore one object of the present invention to provide an improved method and system for data processing.

It is another object of the present invention to provide an improved method and system for maintaining cache coherency in a multiprocessor data processing system.

It is yet another object of the present invention to provide a cache coherency protocol for a multiprocessor data processing system, which includes a recent (R) state that supports shared intervention and a hovering (H) state that permits a first cache to be updated with valid data in response to a second cache independently transmitting the valid data on an interconnect coupling the first and second caches.

The foregoing objects are achieved as is now described. A data processing system is provided that includes a plurality of processors and a plurality of caches coupled to an interconnect. According to the method of the present invention, a first data item is stored in a first of the caches in association with an address tag indicating an address of the first data item. A coherency indicator in the first cache is set to a first state that indicates that the tag is valid and that the first data item is invalid. Thereafter, the interconnect is snooped to detect a data transfer initiated by another of the plurality of caches, where the data transfer is associated with the address indicated by the address tag and contains a valid second data item. In response to detection of such a data transfer while the coherency indicator is set to the first state, the first data item is replaced by storing the second data item in the first cache in association with the address tag. In addition, the coherency indicator is updated to a second state indicating that the second data item is valid and that the first cache can supply said second data item in response to a request.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
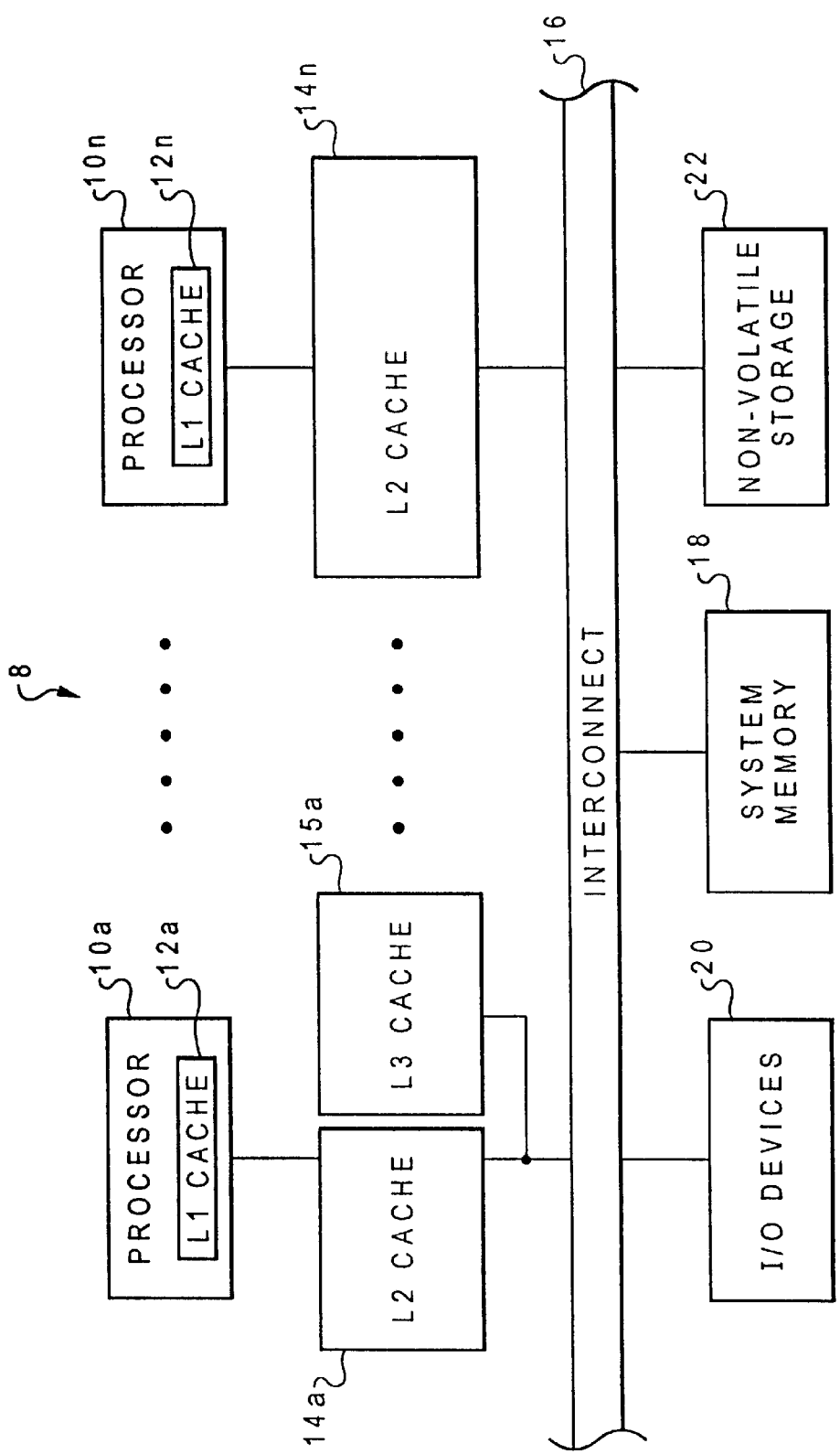
FIG. 1 depicts an illustrative embodiment of a multiprocessor data processing system in accordance with the present invention.

With reference now to the figures, and in particular with reference to FIG. 1, there is illustrated a high level block diagram of a multiprocessor data processing system in accordance with the present invention. As depicted, data processing system 8 includes a number of processors 10a–10n, which each preferably comprise one of the PowerPC™ line of processors available from Internal Business Machines Corporation. In addition to the conventional registers, instruction flow logic and execution units utilized to execute program instructions, each of processors 10a–10n also includes an associated one of on-board level one (L1) caches 12a–12n, which temporarily stores instructions and data that are likely to be accessed by the associated processor. Although L1 caches 12a–12n are illustrated in FIG. 1 as unified caches that store both instruction and data (both referred to hereinafter simply as data), those skilled in the art will appreciate that each of L1 caches 12a–12n could alternatively be implemented as bifurcated instruction and data caches.

In order to minimize data access latency, data processing system 8 also includes one or more additional levels of cache memory, such as level two (L2) caches 14a–14n, which are utilized to stage data to L1 caches 12a–12n. In other words, L2 caches 14a–14n function as intermediate storage between system memory 18 and L1 caches 12a–12n, and can typically store a much larger amount of data than L1 caches 12a–12n, but at a longer access latency. For example, L2 caches 14a–14n may have a storage capacity of 256 or 512 kilobytes, while L1 caches 12a–12n may have a storage capacity of 64 or 128 kilobytes. Processor 10a is further supported by a lookaside L3 cache 15a, which is connected to interconnect 16 in parallel with L2 cache 14a and preferably has a storage capacity equal to or greater than L2 cache 14a.

As illustrated, data processing system 8 further includes I/O devices 20, system memory 18, and non-volatile storage 22, which are each coupled to interconnect 16. I/O devices 20 comprise conventional peripheral devices, such as a display device, keyboard, and graphical pointer, which are interfaced to interconnect 16 via conventional adapters. Non-volatile storage 22 stores an operating system and other software, which are loaded into volatile system memory 18 in response to data processing system 8 being powered on. Of course, those skilled in the art will appreciate that data processing system 8 can include many additional components that are not shown in FIG. 1, such as serial and parallel ports for connection to networks or attached devices, a memory controller that regulates access to system memory 18, etc.

Interconnect 16, which can comprise one or more buses or a cross-point switch, serves as a conduit for communication transactions between L2 caches 14a–14n, L3 cache 15a, system memory 18, input/output (I/O) devices 20, and non-volatile storage 22. A typical communication transaction on interconnect 16 includes a source tag indicating the source of the transaction, a destination tag specifying the intended recipient of the transaction, an address and/or data. Each device connected to interconnect 16 preferably snoops all communication transactions on interconnect 16.

Figure 2:
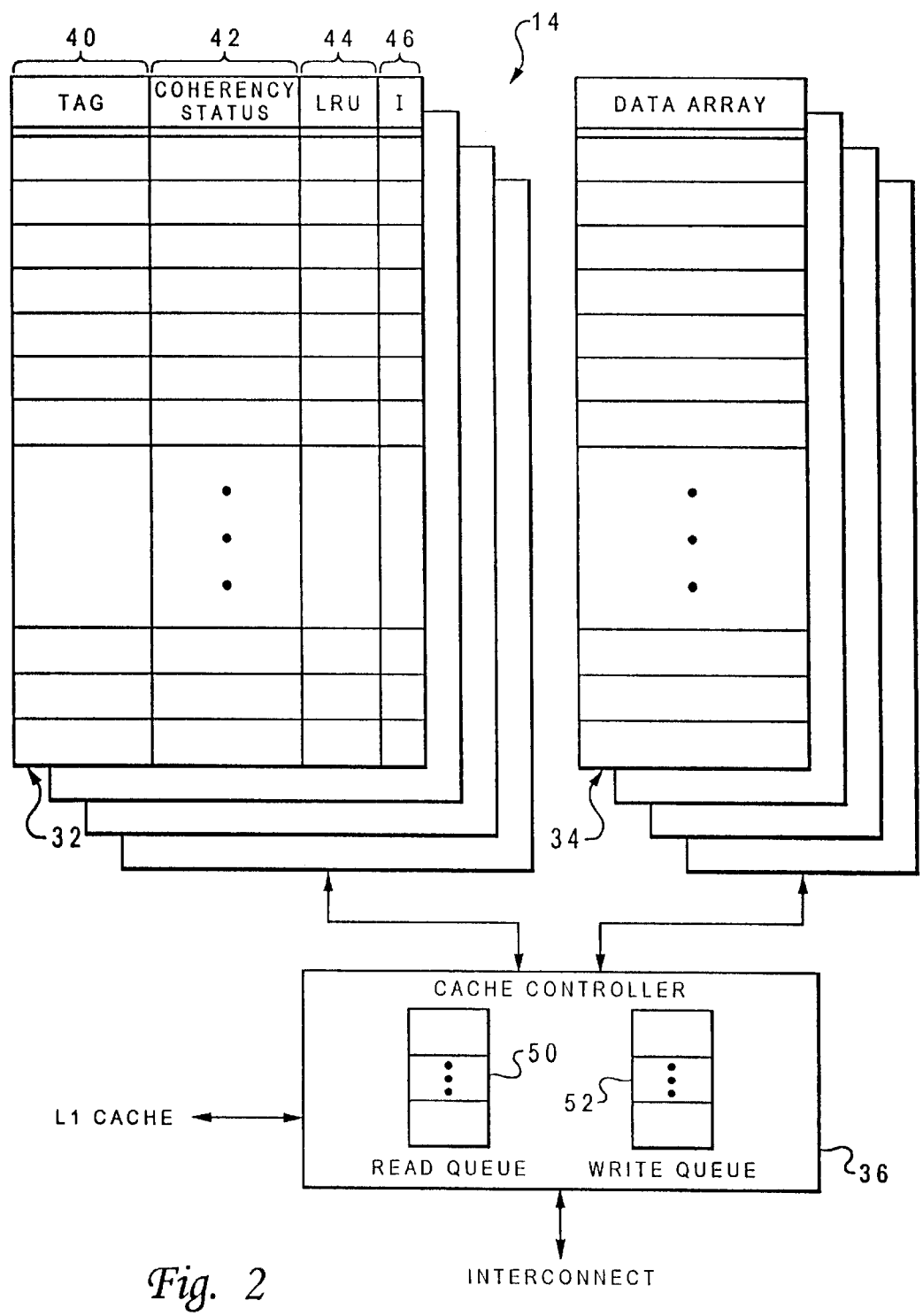
FIG. 2 is a block diagram depicting an illustrative embodiment of a cache in accordance with the present invention.

With reference now to FIG. 2, there is depicted a more detailed block diagram of an illustrative embodiment of an L2 cache 14 in accordance with the present invention. In the illustrative embodiment, L2 cache 14 is an eight-way set associative cache that utilizes 32-bit addresses. Accordingly, data array 34 of L2 cache 14 comprises a number of congruence classes that each contain 8 ways for storing cache lines. As in conventional set associative caches, memory locations in system memory 18 are mapped to particular congruence classes within data array 34 utilizing index bits within the address of the memory location (e.g., bits 20–26 of a 32-bit address).

The cache lines stored within data array 34 are recorded in cache directory 32, which contains one directory entry for each way in data array 34. Each directory entry comprises a tag field 40, coherency status field 42, least recently used (LRU) field 44, and inclusion field 46. Tag field 40 specifies which cache line is stored in the corresponding way of data array 34 by storing the tag bits (e.g., bits 0–19) of the system memory address of the cache line. As discussed in detail below with reference to FIG. 3, coherency status field 42 indicates the coherency status of the data stored in the corresponding way of data array 34 utilizing predefined bit combinations. LRU field 44 indicates how recently the corresponding way of data array 34 has been accessed relative to the other ways of its congruence class, thereby indicating which cache line should be cast out of the congruence class in response to a cache miss. Finally, inclusion field 46 indicates whether or not the cache line stored in the corresponding way of data array 34 is also stored in the associated L1 cache 12.

Still referring to FIG. 2, L2 cache 14 further includes cache controller 36, which manages storage and retrieval of data within data array 34 and updates to cache directory 32 in response to signals received from the associated L1 cache 12 and transactions snooped on interconnect 16. As illustrated, cache controller 36 contains a read queue 50 and a write queue 52 from which cache controller 36 performs updates to cache directory 32 and accesses to data array 34. For example, in response to receiving a read request from the associated L1 cache 12, cache controller 36 places the read request in an entry within read queue 50. Cache controller 36 services the read request by supplying the requested data to the associated L1 cache 12 and thereafter removes the read request from read queue 50. As another example, cache controller 36 may snoop a transaction initiated by another of L2 caches 14a–14n indicating that a remote processor 10 intends to modify its local copy of a specified cache line. In response to snooping this transaction, cache controller 36 places a request to read cache directory 32 in read queue 50 in order to determine if the specified cache line is resident in data array 34. If so, cache controller 36 places an appropriate response on interconnect 16 and, if necessary, inserts a directory write request in write queue 52, that when serviced, updates the coherency status field associated with the specified cache line. Although FIG. 2 illustrates an embodiment in which only one read queue and one write queue are utilized, it should be understood that the number of queues employed by cache controller 36 is a matter of design choice and that cache controller 36 may employ separate queues for cache directory accesses and data array accesses.

L3 cache 15a is constructed like the L2 cache 14 shown in FIG. 2 with minor exceptions. In particular, the cache controller of L3 cache 15a is not connected to L2 cache 14a by inter-cache connections, but, as noted above, is instead connected to interconnect 16 in parallel with L2 cache 14a such that the cache controller of L3 cache 15a snoops all transactions issued on interconnect 16 by L2 cache 14a.

Figure 3:
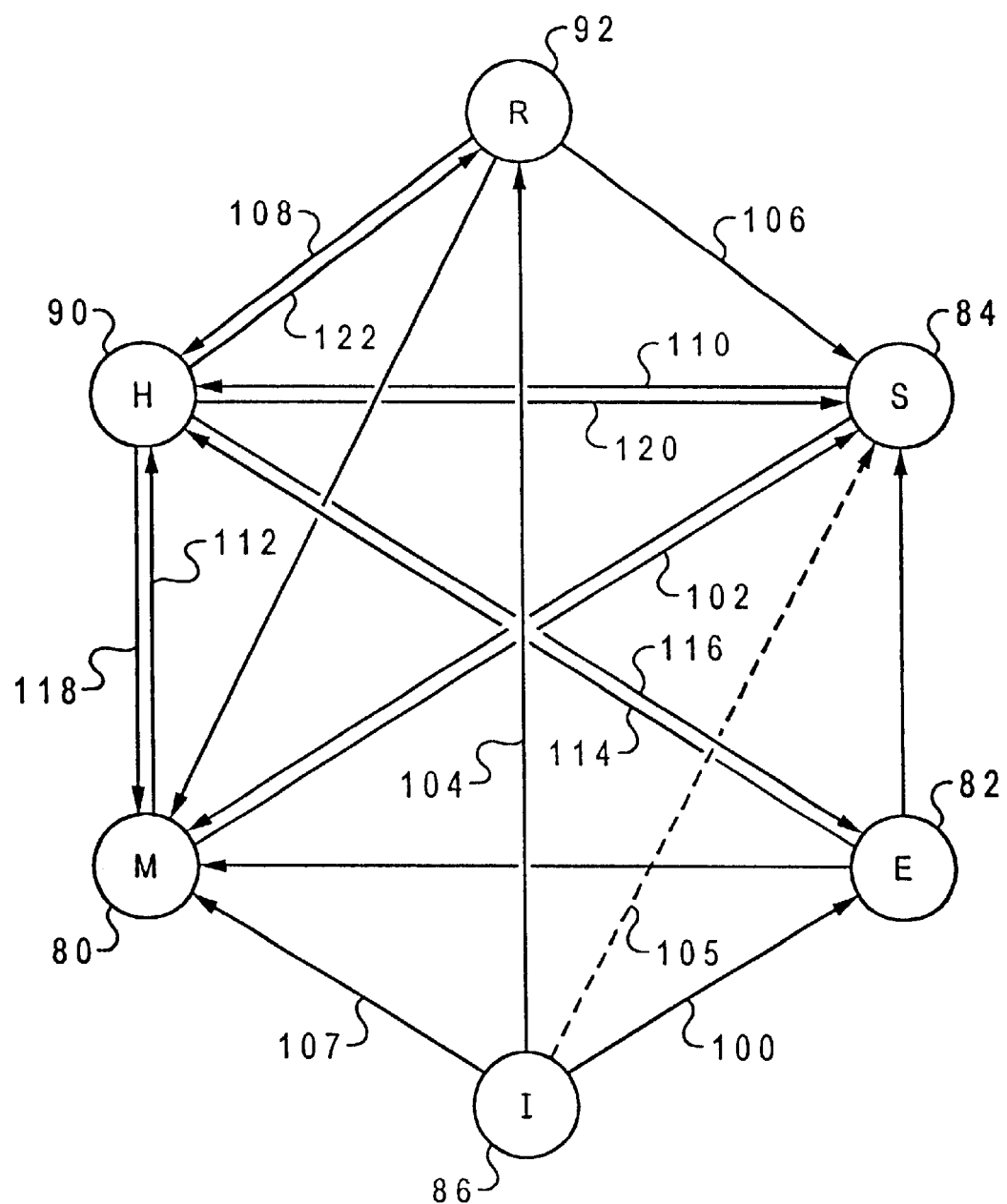
FIG. 3 is a state diagram depicting an illustrative embodiment of the HR-MESI cache coherency protocol of the present invention.

With reference now to FIG. 3, there is depicted an illustrative embodiment of an HR-MESI cache coherency protocol in accordance with the present invention. The illustrated HR-MESI protocol is preferably implemented by the lowest level of in-line cache in the memory hierarchy (i.e., L2 caches 14a–14n) and, with minor variations, by any lower level lookaside caches (i.e., L3 cache 15a). Higher level caches preferably implement protocol subsets such as the conventional MESI protocol or the R-MESI protocol, which is described in U.S. Pat. application Ser. No. 08/839,548, U.S. Pat. No. 5,996,049, incorporated herein by reference in its entirety. It should be understood, however, that alternative embodiments of data processing system 8 can implement the HR-MESI protocol at each level of cache in the memory hierarchy at the expense of additional inter-cache communication traffic.

As shown in FIG. 3, the HR-MESI cache coherency protocol includes the conventional modified (M), exclusive (E), shared (S), and invalid (I) states of the MESI protocol, which are respectively identified by reference numerals 80, 82, 84, and 86. In addition, the HR-MESI cache coherency protocol of the present invention includes hovering (H) state 90, which indicates that the address tag stored in the associated tag field 40 is valid but that the data item (e.g., cache line or cache sector) stored in the corresponding way of data array 34 is invalid, and R state 92, which indicates which cache, out of multiple caches that store copies of a data item, has most recently received the shared data item via a transaction on interconnect 16.

In a preferred embodiment, coherency status field 42 of each entry of each L2 cache directory 32 is initialized to I state 86 at power-on to indicate that both tag field 40 and the data stored in the corresponding way of data array 34 are invalid. L1 and L3 cache directory entries are similarly initialized to the invalid state. Thereafter, the coherency status of a cache line (or cache sector) stored in one of L2 caches 14a–14n or L3 cache 15a in invalid state 86 can be updated to one of M state 80, E state 82, or R state 92, depending upon both the types of memory requests made by processors 10a–10n and the response of the memory hierarchy to those requests.

For example, if processor 10a makes a read request in response to a load instruction, L1 cache 12a first makes a determination of whether or not the requested data is resident in L1 cache 12a. In response to a hit in L1 cache 12a, L1 cache 12a simply supplies the requested data to processor 10a. However, in response to miss in L1 cache 12a, L1 cache 12a forwards the read request to L2 cache 14a via inter-cache connections. In response to a hit in L2 cache 14a, the requested data is supplied by L2 cache 14a to L1 cache 12a, which stores the requested data in association with the appropriate coherency status and forwards the requested data to processor 10a.

If, however, the read request misses in both L1 cache 12a and L2 cache 14a, cache controller 36 of L2 cache 14a presents the read request as a transaction on interconnect 16, which is snooped by each of L2 caches 14b–14n as well as by L3 cache 15a. In response to snooping the read request on interconnect 16, cache controller 36 in each of L2 caches 14b–14n determines if the requested data is resident in its data array 34 or the associated one of L1 caches 12b–12n. The cache controller of L3 cache 15a similarly determines if the read request hits in the L3 cache directory. If none of L2 caches 14b–14n, L1 caches 12b–12n, and L3 cache 15a stores the requested data, each of L2 caches 14a–14n and L3 cache 15a returns a null response to L2 cache 14a, which then requests the data from system memory 18. When the requested data is returned to L2 cache 14a from system memory 18, cache controller 36 forwards the requested data to L1 cache 12a, stores the requested data in its data array 34, and updates the coherency status field 42 associated with the way storing the requested data from I state 86 to E state 82, as indicated by reference numeral 100. As in the conventional MESI protocol, E state 82 indicates that the associated cache line is valid and is not resident in any other cache at the second level of the memory hierarchy. L3 cache 15a similarly stores the requested data in E state 82.

If the data requested by processor 10a is not resident in L1 cache 12a, L2 cache 14a, or L3 cache 15a, but is stored, for example, in L1 cache 12n in M state 80, cache controller 36 of L2 cache 14n responds to the read request with a modified response and signals L1 cache 12n to push the requested data to L2 cache 14n. Thereafter, L2 cache 14n sources the requested data on interconnect 16. In response to the read request, the coherency status of the requested data in L1 cache 12n and L2 cache 14n is updated to S state 84 as indicated by reference numeral 102. In accordance with the present invention, the coherency status of the way in which the requested data is stored in L2 cache 14a makes a transition from I state 86 to R state 92, as indicated by reference numeral 104. As noted above, R state 92 indicates that the associated data has been most recently referenced by L2 cache 14a and that L2 cache 14a will source the data in response to snooping a request for the data on interconnect 16. When L3 cache 15a snoops the return of the requested data from system memory 18, L3 cache 15a samples the requested data and stores the data in S state 84. The transition between I state 86 and S state 84 shown at reference numeral 105 is represented using dashed-line illustration to indicate that this transition is only applicable to L3 cache 15a. Those skilled in the art will appreciate from the foregoing example that the same state transitions will be made in alternative embodiments of the present invention that do not support modified intervention; however, in those alternative embodiments, the requested data is obtained from system memory 18 at the cost of additional access latency.

L2 cache 14a similarly makes a transition from I state 86 to R state 92 in response to receiving either a shared intervention response or a shared response to its read request. L2 cache 14a receives a shared intervention response (and the requested data) if one of L2 caches 14b–14n, for example, L2 cache 14n, stores the requested data in R state 92 or E state 82. In response to the read request, cache controller 36 of L2 cache 14n updates the coherency status of its copy of the requested data from R state 92 to S state 84 as indicated by reference numeral 106. If none of L2 caches 14b–14n stores the requested data in R state 92, but at least one stores the requested data in S state 84, the L2 cache 14 storing the requested data in S state 84 responds to the read request with a shared response, leaving its copy of the requested data in S state 84. In response to receipt of only a shared response, L2 cache 14a retrieves the requested data from system memory 18 and stores the requested data in R state 92. In both cases, L3 cache 15a samples the requested data and stores the data in S state 84.

If L2 cache 14a issues a "read with intent to modify" request on interconnect 16 indicating that processor 10a desires to acquire exclusive use of a memory location for the purpose of modifying it, the requested data is obtained from L3 cache 15a, a remote L2 cache 14, or system memory 18 as described above. However, when the requested cache line is obtained, L1 cache 12a and L2 cache 14a store the requested cache line in M state 80 as illustrated at reference numeral 107. In addition, because the "read with intent to modify" transaction indicates that other copies of the requested cache line will become stale, L3 cache 15a and remote L1 and L2 caches must indicate that their copies of the requested cache line are invalid. In L1 caches 12b–12n, any copies of the requested cache line are simply marked as invalid. However, the coherency status of copies of the requested cache line stored in L3 cache 15a and L2 caches 14b–14n are not updated to I state 86 as in conventional multiprocessor data processing systems that utilize cross-invalidation (XI). Instead, in accordance with an important aspect of the present invention, each of L2 caches 14b–14n and L3 cache 15a that store a copy of the requested cache line updates the coherency status field 42 associated with its copy from any of R state 92, S state 84, M state 80, or E state 82 to H state 90, as indicated by reference numerals 108, 110, 112, and 114, respectively. As noted above, H state 90 indicates that the tag stored in tag field 40 remains valid, but that the associated cache line within data array 34 is invalid. Entries in L2 and L3 cache directories are similarly updated to H state 90 in response to other snooped transactions that require data to be invalidated, including kills (i.e., transactions that explicitly invalidate a specified data block), flushes (i.e., transactions that invalidate a specified data block and copy any modified data to system memory), dclaims (i.e., transactions that invalidate copies of a cache line marked as shared in remote caches in response to a local copy of the cache line becoming modified in response to a store), etc.

As indicated by reference numerals 116 and 118, a cache directory entry can make a transition from H state 90 to E state 82 or M state 80, respectively, depending upon the types of transactions received by the cache. For example, a directory entry of L2 cache 14a that is in H state 90 makes a transition to E state 82 in response to processor 10a making a read request that (after missing in both L1 cache 12a and L2 cache 14a) receives a null response from L3 cache 15a and L2 caches 14b–14n. E state 82 signifies that the data retrieved from system memory 18 will, of all L2 caches 14a–14n, be stored only in L2 cache 14a. If, on the other hand, processor 10a indicates an intent to store data to a way of L1 cache 12a that is in H state 90, L1 cache 12a indicates that intent to L2 cache 14a, which then issues a "read with intent to modify" transaction on interconnect 16. As discussed above, copies of the requested cache line stored in L3 cache 15a and L2 caches 14b–14n are updated to H state 90 in response to snooping the "read with intent to modify" transaction, and copies of the requested cache line stored in L1 caches 12b–12n are marked as invalid. Once the requested cache line is obtained, the coherency status of the cache line in L2 cache 14a and L1 cache 12a is set to M state 80 to signify that the cache line is valid, but is not coherent with system memory 18.

A cache directory entry in H state 90 can also be updated to S state 84 as illustrated at reference numeral 120. As described above, each of L2 caches 14a–14n snoops all transactions issued on interconnect 16. If one of L2 caches 14a–14n, for example, L2 cache 14a, snoops a transaction issued by another of L2 caches 14b–14n that includes an updated (i.e., valid) copy of data that is stored in L2 cache 14a in H state 90, cache controller 36 of L2 cache 14a samples the data from interconnect 16, stores the snooped data in data array 34, and updates the associated coherency status field 42 from H state 90 to S state 84. In this manner the present invention permits a cache directory entry in H state 90 to be updated to S state 84 without the associated processor 10 making a data request or the cache initiating a transaction on interconnect 16. Of course, in the above scenario L2 cache 14a also provides a response to the snooped transaction, if a response is required to maintain coherency. For example, if the snooped transaction is a read request, L2 cache 14a must provide a shared response indicating its intention to sample the requested data so that the requesting L2 cache stores the requested data in R state 92 rather than E state 82. Transactions on interconnect 16 that can be snooped in this way to refresh invalid data associated with a valid address tag include read transactions, write transactions, data writebacks to system memory 18 due to cache line castouts, etc.

A cache directory entry in H state 90 may also be updated to R state 92 in response to a number of different request/response scenarios. For example, if processor 10a makes a read request that misses in L1 cache 12a and results in a tag hit in L2 cache 14a and if the coherency status field 42 associated with the matching tag is in H state 90, cache controller 36 of L2 cache 14a issues a read transaction on interconnect 16. In response to receipt of a shared intervention response, shared response, or modified response to the read transaction from L3 cache 15a and L2 caches 14b–14n, cache controller 36 of L2 cache 14a updates the coherency status field 42 associated with the requested data from H state 90 to R state 92, as illustrated at reference numeral 122.

More importantly, a cache directory entry in H state 90 can be updated to R state 92 without the associated processor requesting data. For example, following a "read with intent to modify" request by processor 10a, L1 cache 12a and L2 cache 14a store the requested data in M state 80, while the coherency status of any copies of the cache line in L3 cache 15a and L2 caches 14b–14n is set to H state 90. If the requested data is subsequently selected for replacement from L2 cache 14a, for example, in response to a read miss, cache controller 36 of L2 cache 14a issues a write transaction on interconnect 16 in order to store the requested data to system memory 18. In response to snooping this write transaction, the cache controller of L3 cache 15a samples the data, stores the data in its L3 data array, and updates the associated coherency status field from H state 90 to R state 92, such that L3 cache 15a can subsequently source the data in response to receipt of a read or "read with intent to modify" request.

State transitions that may be made in the illustrative embodiment of the HR-MESI cache coherency protocol depicted in FIG. 3 are summarized below in Table I.

TABLE I

| State Transition | Causes | Notes |
|---|---|---|
| I → E | processor read with null response | "processor read" denotes a read request by the associated (i.e., local) processor |
| I → R | (1) processor read with shared intervention (shI) response; (2) processor read with shared response; (3) processor read with modified response | |
| I → S | processor read with any response except null | L3 lookaside cache only; L2 transitions to R as noted above |
| I → M | processor "read with intent to modify" (rwitm) | |
| E → S | snooped read | source intervention data |
| E → M | processor rwitm | |
| E → H | snooped data invalidate | snooped data invalidates include rwitm, dclaim, kill, flush, etc |
| R → S | snooped read | source intervention data |
| R → M | processor rwitm | issue dclaim on interconnect |
| R → H | snooped data invalidate | |
| S → M | processor rwitm | issue dclaim on interconnect |
| S → H | snooped data invalidate | |
| M → S | snooped read | source data if modified intervention is supported |
| M → H | snooped data invalidate | if snooped transaction is rwitm, source data if modified intervention is supported |
| H → E | processor read with null response | |
| H → R | (1) processor read with ShI response; (2) processor read with shared response; (3) processor read with modified response; (4) snooped write issued by a local cache controller | |
| H → S | snooped read or write issued by a remote cache controller | |
| H → M | processor rwitm | |

As has been described, the present invention provides an improved method and system for maintaining cache coherency in a multiprocessor data processing system. The improved cache coherency protocol provided by the present invention permits an invalid data item stored within a cache in association with a valid address tag to be automatically updated with valid data without the local processor issuing an explicit read or write request. In this manner, data invalidated by the activity of remote processors can be refreshed prior to the data being accessed by the local processor, thereby substantially reducing access latency by eliminating the need to retrieve the data from a remote cache or system memory. Data access latency is also substantially reduced by the cache coherency protocol of the present invention through the support of shared intervention, which supplies data stored in shared state from a remote cache rather than system memory.

While the invention has been particularly shown and described with reference to an illustrative embodiment, it will be understood by those skilled in the art that various changes in form and detail may be made therein without departing from the spirit and scope of the invention. For example, the illustrative embodiment of a memory coherency protocol depicted in FIG. 3 could be modified by eliminating I state 86 because that state is only utilized to initialize directory entries at power-on and is never re-entered from another state. If I state 86 were eliminated, at power-on the coherency status field of each L2 directory entry would be initialized to H state 90, and the tag field of each L2 directory entry would be initialized to a tag value that is unique at least within the same congruence class.

What is claimed is:

1. A method of maintaining cache coherency in a data processing system including a plurality of processors and a plurality of caches coupled to an interconnect, said method comprising:

in a first cache among said plurality of caches, storing a first data item in association with an address tag indicating an address of said first data item;

setting a coherency indicator in said first cache to a first state that indicates that said address tag is valid and that said first data item is invalid in said first cache;

thereafter, in response to snooping a data transfer on said interconnect associated with said address indicated by said address tag while said coherency indicator is set to said first state, said data transfer being initiated by a second cache among said plurality of caches and including a second data item, storing said second data item in said first cache in association with said address tag; and updating said coherency indicator to a second state indicating that said second data item is valid in said first cache and that, of said plurality of caches, only said first cache will supply said second data item in response to a request while said coherency indicator is in said second state.

2. The method of claim 1, wherein said step of updating said coherency indicator to a second state comprises the step of updating said coherency indicator to a second state that indicates that said second data item is stored in both said first cache and another of said plurality of caches.

3. The method of claim 1, and further comprising the step of:

in response to receipt at said first cache of a request for said second data item while said coherency indicator is set to said second state, said request being received via said interconnect, placing said second data item on said interconnect.

4. A method of maintaining cache coherency in a data processing system including a plurality of processors and a plurality of caches coupled to an interconnect, said method comprising:

in a first cache among said plurality of caches, storing a first data item in association with an address tag indicating an address of said first data item;

setting a coherency indicator in said first cache to a first state that indicates that said address tag is valid and that said first data item is invalid in said first cache in response to one of said plurality of processors indicating an intention to store to said address indicated by said address tag;

thereafter, in response to snooping a data transfer on said interconnect associated with said address indicated by said address tag while said coherency indicator is set to said first state, said data transfer being initiated by a second cache among said plurality of caches and including a second data item, storing said second data item in said first cache in association with said address tag; and updating said coherency indicator to a second state indicating that said second data item is valid in said first cache and that, of said plurality of caches, only said first cache will supply said second data item in response to a request while said coherency indicator is in said second state.

5. A method of maintaining cache coherency in a data processing system including a plurality of processors and a plurality of caches coupled to an interconnect, said method comprising:

in a first cache among said plurality of caches, said first cache being associated with a particular processor among said plurality of processors, storing a first data item in association with an address tag indicating an address of said first data item;

setting a coherency indicator in said first cache to a first state that indicates that said address tag is valid and that said first data item is invalid in said first cache;

thereafter, in response to snooping a data transfer on said interconnect associated with said address indicated by said address tag while said coherency indicator is set to said first state, said data transfer being initiated by a second cache among said plurality of caches and including a second data item, storing said second data item in said first cache in association with said address tag; and updating said coherency indicator to a second state indicating that said second data item is valid in said first cache and that, of said plurality of caches, only said first cache will supply said second data item in response to a request while said coherency indicator is in said second state.

wherein said step of snooping a data transfer on said interconnect associated with said address indicated by said address tag comprises snooping a data transfer issued by a higher level cache associated with said particular processor.

6. A cache for supporting cache coherency in a data processing system including a plurality of processors and a plurality of caches coupled to an interconnect, said cache comprising:

data storage;

tag storage that stores an address tag indicating an address of a data item contained in said data storage;

a coherency indicator having at least first and second states, wherein said first state indicates that said address tag is valid and that a data item in said data storage is invalid, and wherein said second state indicates that a data item in said data storage is valid and that, of said plurality of caches, only said cache will supply said data item in response to a request while said coherency indicator is in said second state; and a cache controller that responsive to detection of a data transfer on said interconnect associated with said address indicated by said address tag while said coherency indicator is set to said first state, said second transaction being initiated by a second cache among said plurality of caches and including a second data item, (1) stores said second data item in said data storage in association with said address tag and (2) updates said coherency indicator to said second state.

7. The cache of claim 6, wherein said second state of said coherency indicator further indicates that said second data item is stored in both said first cache and another of said plurality of caches.

8. The cache of claim 6, wherein said cache controller, responsive to receipt via said interconnect of a request for said second data item while said coherency indicator is set to said second state, places said second data item on said interconnect.

9. A cache for supporting cache coherency in a data processing system including a plurality of processors and a plurality of caches coupled to an interconnect, said cache comprising:

data storage;

tag storage that stores an address tag indicating an address of a data item contained in said data storage;

a coherency indicator having at least first and second states, wherein said first state indicates that said address tag is valid and that a data item in said data storage is invalid, and wherein said second state indicates that a data item in said data storage is valid and that, of said plurality of caches, only said cache will supply said data item in response to a request while said coherency indicator is in said second state; and a cache controller that responsive to detection of a data transfer on said interconnect associated with said address indicated by said address tag while said coherency indicator is set to said first state, said second transaction being initiated by a second cache among said plurality of caches and including a second data item, (1) stores said second data item in said data storage in association with said address tag and (2) updates said coherency indicator to said second state, wherein said cache controller sets said coherency indicator to said first state in response to one of said plurality of processors indicating an intention to store to said address indicated by said address tag.

10. A cache for supporting cache coherency in a data processing system including a plurality of processors and a plurality of caches coupled to an interconnect, said cache being associated with a particular processor among said plurality of processors and comprising:

data storage;

tag storage that stores an address tag indicating an address of a data item contained in said data storage;

a coherency indicator having at least first and second states, wherein said first state indicates that said address tag is valid and that a data item in said data storage is invalid, and wherein said second state indicates that a data item in said data storage is valid and that, of said plurality of caches, only said cache will supply said data item in response to a request while said coherency indicator is in said second state; and a cache controller that responsive to detection of a data transfer on said interconnect associated with said address indicated by said address tag while said coherency indicator is set to said first state, said second transaction being initiated by a second cache among said plurality of caches and including a second data item, (1) stores said second data item in said data storage in association with said address tag and (2) updates said coherency indicator to said second state;

wherein said cache controller stores said second data item in said data storage responsive to snooping a data transfer issued by a higher level cache associated with said particular processor.

11. A data processing system, comprising:

an interconnect;

a plurality of processors coupled to said interconnect;

a plurality of caches that are each associated with a processor among said plurality of processors, wherein a first cache among said plurality of caches includes:

data storage;

tag storage that stores an address tag indicating an address of a data item contained in said data storage;

a coherency indicator having at least first and second states, wherein said first state indicates that said address tag is valid and that a data item in said data storage is invalid, and wherein said second state indicates that a data item in said data storage is valid and that, of said plurality of caches, only said first cache will supply said data item in response to a request while said coherency indicator is in said second state; and a cache controller that responsive to detection of a data transfer on said interconnect associated with said address indicated by said address tag while said coherency indicator is set to said first state, said second transaction being initiated by a second cache among said plurality of caches and including a second data item, (1) stores said second data item in said data storage in association with said address tag and (2) updates said coherency indicator to said second state.

12. The data processing system of claim 11, wherein said second state of said coherency indicator further indicates that said second data item is stored in both said first cache and another of said plurality of caches.

13. The data processing system of claim 11, wherein said cache controller, responsive to receipt via said interconnect of a request for said second data item while said coherency indicator is set to said second state, places said second data item on said interconnect.

14. The data processing system of claim 12, wherein said first cache is connected to said interconnect in a lookaside configuration.

15. A data processing system, comprising:

an interconnect;

a plurality of processors coupled to said interconnect;

a plurality of caches that are each associated with a processor among said plurality of processors, wherein a first cache among said plurality of caches includes:

data storage;

tag storage that stores an address tag indicating an address of a data item contained in said data storage;

a coherency indicator having at least first and second states, wherein said first state indicates that said address tag is valid and that a data item in said data storage is invalid, and wherein said second state indicates that a data item in said data storage is valid and that, of said plurality of caches, only said first cache will supply said data item in response to a request while said coherency indicator is in said second state; and a cache controller that responsive to detection of a data transfer on said interconnect associated with said address indicated by said address tag while said coherency indicator is set to said first state, said second transaction being initiated by a second cache among said plurality of caches and including a second data item, (1) stores said second data item in said data storage in association with said address tag and (2) updates said coherency indicator to said second state;

wherein said cache controller sets said coherency indicator to said first state in response to one of said plurality of processors indicating an intention to store to said address indicated by said address tag.

16. A data processing system, comprising:

an interconnect;

a plurality of processors coupled to said interconnect;

a plurality of caches that are each associated with a processor among said plurality of processors, wherein a first cache among said plurality of caches is associated with a particular processor among said plurality of processors and includes:

data storage;

tag storage that stores an address tag indicating an address of a data item contained in said data storage;

a coherency indicator having at least first and second states, wherein said first state indicates that said address tag is valid and that a data item in said data storage is invalid, and wherein said second state indicates that a data item in said data storage is valid and that, of said plurality of caches, only said first cache will supply said data item in response to a request while said coherency indicator is in said second state; and a cache controller that responsive to detection of a data transfer on said interconnect associated with said address indicated by said address tag while said coherency indicator is set to said first state, said second transaction being initiated by a second cache among said plurality of caches and including a second data item, (1) stores said second data item in said data storage in association with said address tag and (2) updates said coherency indicator to said second state;

wherein said cache controller stores said second data item in said data storage responsive to snooping a data transfer issued by a higher level cache associated with said particular processor.

* * * * *